(12) United States Patent
Park (10) Patent No.: US 9,479,333 B2
(45) Date of Patent: Oct. 25, 2016

(54) METHOD OF MANAGING SENSITIVE DATA IN MOBILE TERMINAL AND ESCROW SERVER FOR PERFORMING SAME

(71) Applicant: ELECTRONICS AND TELECOMMUNICATIONS RESEARCH INSTITUTE, Daejeon (KR)

(72) Inventor: Suwan Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 92 days.

(21) Appl. No.: 14/451,546

(22) Filed: Aug. 5, 2014

(65) Prior Publication Data

US 2015/0098567 A1 Apr. 9, 2015

(30) Foreign Application Priority Data

Oct. 4, 2013 (KR) ........................ 10-2013-0118523

(51) Int. Cl.
```
G06F 1/26      (2006.01)
H04L 9/08      (2006.01)
H04L 29/06     (2006.01)
G06F 21/62     (2013.01)
H04W 12/02     (2009.01)
H04W 12/04     (2009.01)
H04L 29/08     (2006.01)
```
(52) U.S. Cl.
CPC ......... *H04L 9/0894* (2013.01); *G06F 21/6218* (2013.01); *G06F 21/6272* (2013.01); *H04L 63/0464* (2013.01); *H04W 12/02* (2013.01); *H04L 63/0478* (2013.01); *H04L 63/062* (2013.01); *H04L 67/1095* (2013.01); *H04W 12/04* (2013.01)

(58) Field of Classification Search
CPC ............ H04L 9/0894; H04L 63/0464; H04L 63/0478; H04L 63/062; G06F 21/6218; G06F 21/6272
USPC .................................. 380/44; 713/181, 189
See application file for complete search history.

(56) References Cited

U.S. PATENT DOCUMENTS

| | | | |
|---|---|---|---|
| 8,005,458 B2 | 8/2011 | Baik et al. | |
| 2003/0126430 A1* | 7/2003 | Shimada | G06F 21/10 713/155 |
| 2010/0275005 A1* | 10/2010 | Barfield | G06F 21/316 713/150 |

(Continued)

FOREIGN PATENT DOCUMENTS

| | | | |
|---|---|---|---|
| KR | 10-2010-0056144 | 5/2010 | |
| KR | 10-2013-0005288 | 1/2013 | |
| WO | WO 0122322 A2 * | 3/2001 | ............. G06F 21/31 |

*Primary Examiner* — Samson Lemma
(74) *Attorney, Agent, or Firm* — Staas & Halsey LLP (57) ABSTRACT

A method of managing the sensitive data of a mobile terminal and an escrow server for performing the method are disclosed. In the method of managing the sensitive data of a mobile terminal, an escrow server receives a request for registration from a mobile terminal, a user key is generated in response to the request for registration, a user virtual folder adapted to store the sensitive data of the mobile terminal is generated, encrypted sensitive data is received from the mobile terminal if the mobile terminal determines to store the sensitive data in the escrow server, and the encrypted sensitive data is re-encrypted and stored in the user virtual folder.

6 Claims, 6 Drawing Sheets

(56) References Cited

U.S. PATENT DOCUMENTS

| | | |
|---|---|---|
| 2011/0129089 A1 | 6/2011 | Kim et al. |
| 2011/0224509 A1 | 9/2011 | Fish et al. |
| 2014/0208117 A1* | 7/2014 | Hayashi .............. H04L 63/0471 713/171 |
| 2014/0215210 A1* | 7/2014 | Wang .................. G06F 21/6209 713/165 |

* cited by examiner

METHOD OF MANAGING SENSITIVE DATA IN MOBILE TERMINAL AND ESCROW SERVER FOR PERFORMING SAME

CROSS REFERENCE TO RELATED APPLICATION

This application claims the benefit of Korean Patent Application No. 10-2013-0118523, filed Oct. 4, 2013, which is hereby incorporated by reference in its entirety into this application.

BACKGROUND OF THE INVENTION

1. Technical Field

The present invention relates generally to a method of managing the sensitive data of a mobile terminal and an escrow server for performing the method and, more particularly, to a method of managing the sensitive data of a mobile terminal and an escrow server for performing the method, which are capable of storing the entrusted sensitive data of a user within the mobile terminal and verifying the validity of app software installed on the mobile terminal using an escrow server, thereby enhancing data protection, minimizing damage resulting from the exposure of data attributable to the loss of a mobile terminal, and preventing the installation of illegitimate software.

2. Description of the Related Art

As the spread of mobile terminals having a communication function, such smart phones and tablet PCs, has suddenly increased, the illegitimate leakage and collection of user data related to mobile terminals has also greatly increased.

In particular, as mobile terminals are gradually increasingly used even in companies and governmental institutions and the exchange of company data and military secret data through mobile terminals is increased, there is growing concern about the potential leakage of data.

For example, as disclosed in U.S. Pat. No. 8,005,458 entitled "Device and Method for Detecting and Preventing Sensitive Information Leakage from Portable Terminal," technology in which the leakage of the sensitive data of a portable terminal is detected and prevented has come into common use.

In general, data leakage accidents occur because data is lost due to a user's carelessness or data leaks occur via software, intentionally and unintentionally installed, through the accessing of the sensitive data of the user without a user's consent. Accordingly, there is a need for a method for management which is capable of enhancing the storage and protection of sensitive data in a mobile terminal.

SUMMARY OF THE INVENTION

Accordingly, the present invention has been made keeping in mind the above problems occurring in the conventional art, and an object of the present invention is to provide a method of managing the sensitive data of a mobile terminal and an escrow server for performing the method, which are capable of storing the entrusted sensitive data of a user within the mobile terminal and verifying the validity of app software installed on the mobile terminal using an escrow server, thereby enhancing data protection, minimizing damage resulting from the exposure of data attributable to the loss of a mobile terminal, and preventing the installation of illegitimate software.

In accordance with an aspect of the present invention, there is provided a method of managing the sensitive data of a mobile terminal, including receiving, by an escrow server, a request for registration from a mobile terminal; generating a user key in response to the request for registration; generating a user virtual folder adapted to store the sensitive data of the mobile terminal; receiving encrypted sensitive data from the mobile terminal if the mobile terminal determines to store the sensitive data in the escrow server; and re-encrypting the encrypted sensitive data and storing the re-encrypted sensitive data in the user virtual folder.

The method may further include encrypting, by the mobile terminal, the sensitive data using a user key of the mobile terminal if the mobile terminal determines to store the sensitive data in a storage device of the mobile terminal.

Receiving the encrypted sensitive data from the mobile terminal may include receiving the sensitive data encrypted by the mobile terminal using the user key of the escrow server.

Storing the re-encrypted sensitive data in the user virtual folder may include performing, by the escrow server, verification of validity of software installed on the mobile terminal.

Performing the verification of the validity may include comparing the hash value of the software with a reference hash value stored in the escrow server; determining the software to be legitimate if, as a result of the comparison, the hash value of the software is found to be identical with the reference hash value, and determining the software to be illegitimate if, as a result of the comparison, the hash value of the software is found to be different from the reference hash value; and sending the results of the determination to the mobile terminal.

In accordance with another aspect of the present invention, there is provided an escrow server, including a key management module configured to generate and manage a user key of a registered mobile terminal; a virtual folder management module configured to generate and manage a user virtual folder for storing sensitive data of the mobile terminal; and a user data encryption/decryption unit configured to re-encrypt encrypted sensitive data, received from the mobile terminal, according to policies and to store the re-encrypted sensitive data in the user virtual folder.

The user data encryption/decryption unit may include a use encryption module configured to perform encryption using a user key generated by the mobile terminal; and an escrow server encryption module configured to perform encryption using the user key generated by the escrow server.

The escrow server may further include a software verification module configured to perform verification of validity of software installed on the mobile terminal.

The software verification module may compare the hash value of the software received from the mobile terminal with the original hash value of the software, may determine the software to be legitimate if, as a result of the comparison, the hash value of the software is found to be identical with the original hash value, and may determine the software to be illegitimate if, as the results of the comparison, the hash value of the software is found to be different from the original hash value.

The software verification module may include a software hash value management module configured to refer to the original hash values of new apps registered with the escrow server for verification whenever the new apps of the mobile terminal are generated via a separate system or to internally store and update the original hash values; and an illegitimate software management module configured to manage information about the software if a hash value of the software is found to be different from an original hash value of the software and thus the software is determined to be illegitimate.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention is described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clear.

A method of managing the sensitive data of a mobile terminal and an escrow server for performing the method according to embodiments of the present invention are described in detail below with reference to the accompanying drawings.

Figure 1:
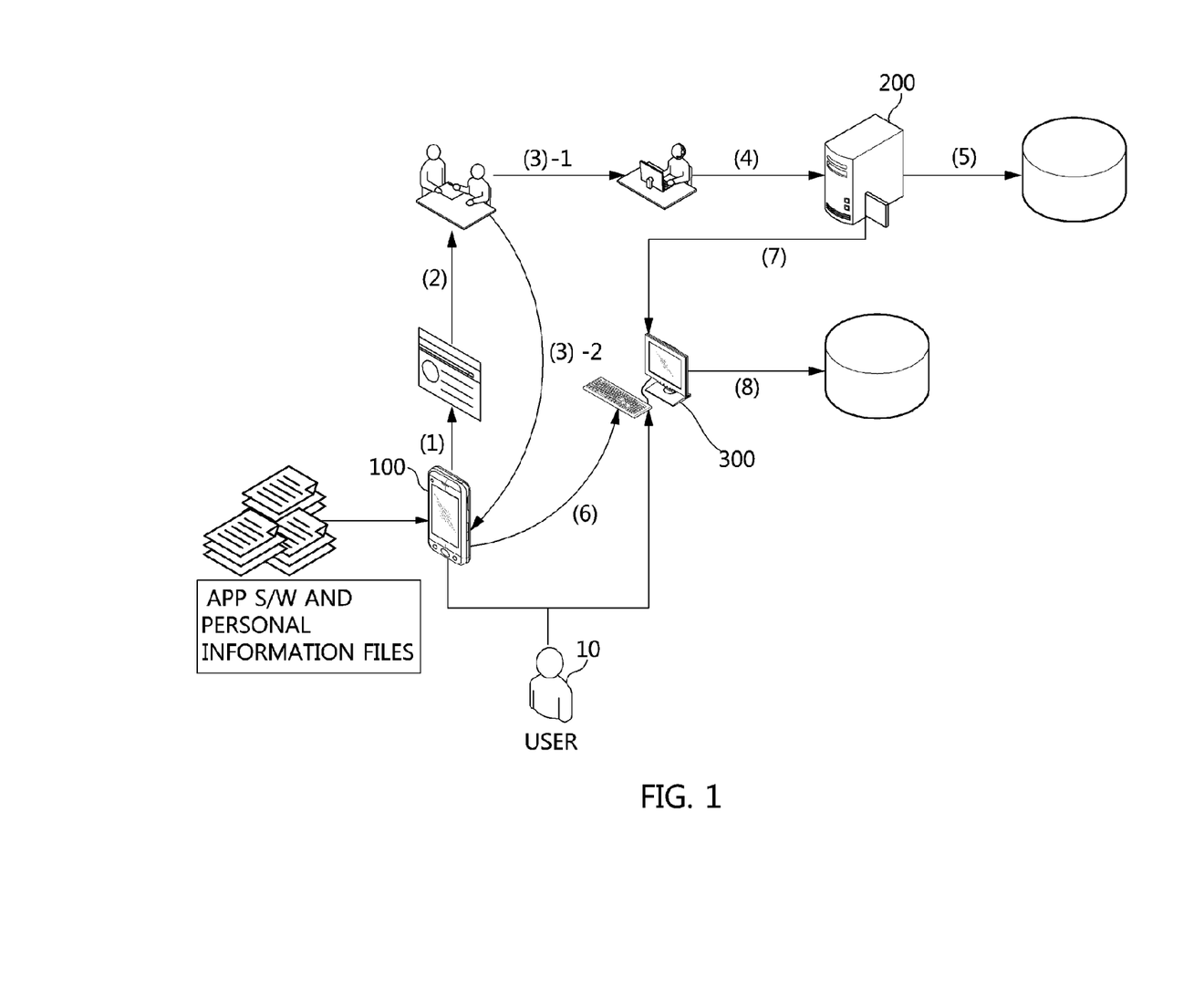
FIG. 1 is a diagram illustrating an environment in which the sensitive data of a mobile terminal is stored through an escrow server according to an embodiment of the present invention.

FIG. 1 is a diagram illustrating an environment in which the sensitive data of a mobile terminal is stored through an escrow server according to an embodiment of the present invention.

Referring to FIG. 1, the environment to which a method of storing the sensitive data of a mobile terminal is applied includes a mobile terminal 100 of a user 10, an escrow server 200, and a user PC 300 of the user 10.

First, the procedure of registering the mobile terminal 100 with the escrow server 200 needs to be performed before the sensitive data of the mobile terminal 100 is stored in the escrow server 200.

The user 10 requests the escrow server 200 to register the mobile terminal 100 via his or her mobile terminal 100 ((1)).

The escrow server 200 performs the procedure of authenticating the mobile terminal 100 and generates a user key EUK using information about the user and information about the mobile terminal ((2)). In this case, the generated user key, together with the information about the mobile terminal, is registered with the escrow server 200 ((3)-1) and, at the same time, the generated user key is transmitted to the mobile terminal 100 ((3)-2).

Thereafter, the escrow server 200 generates a user virtual folder configured to store the sensitive data and log information of the user 10 ((4)), and establishes security storage policies so that the user virtual folder or the files of the user virtual folder are encrypted and stored.

When the mobile terminal 100 of the user 10 is registered with the escrow server 200 as described above, the sensitive data of the mobile terminal 100 is encrypted, stored and managed in the user virtual folder within the escrow server 200 according to user settings ((5)).

Furthermore, if the user 10 requests the sensitive data of the mobile terminal 100 to be shared by the user PC 300 possessed by the user, the user 10 may additionally perform the procedure of registering the user PC 300 when registering the mobile terminal with the escrow server 200 or after registering the mobile terminal with the escrow server 200 ((1)), and may request data synchronization between the mobile terminal 100 and the user PC 300 from the escrow server 200 ((6)). The sensitive data of the mobile terminal 200 within the user PC 300 synchronized by the escrow server 200 may be encrypted and transferred by the mobile terminal 100 or the escrow server 200. The sensitive data may be decrypted using the user key provided by the mobile terminal 100 or the escrow server 200. In this case, the escrow server 200 may check the state of the user PC 300 while operating in conjunction with the mobile terminal 100 ((7)). Furthermore, the user PC 300 stores the encrypted data in a specific database ((8)).

Furthermore, if the user 10 desires to check his or her sensitive data stored in the escrow server 200 through a user terminal not registered with the escrow server 200, the user may temporarily register the user terminal with the escrow server 200 in accordance with a specific authentication procedure, may receive a one-time data key from the escrow server 200, and may check only corresponding data.

The registration of a user terminal with the escrow server 200 may be performed using a user domain concept that helps all terminals possessed by the user to effectively share user data.

That is, the escrow server 200 having a domain management function assigns the same user domain key to all user terminals within a domain when the user terminals are registered with the escrow server 200 so that encrypted data in the present invention may be shared.

The configuration of the mobile terminal 100 is described in detail below with reference to FIG. 2.

Figure 2:
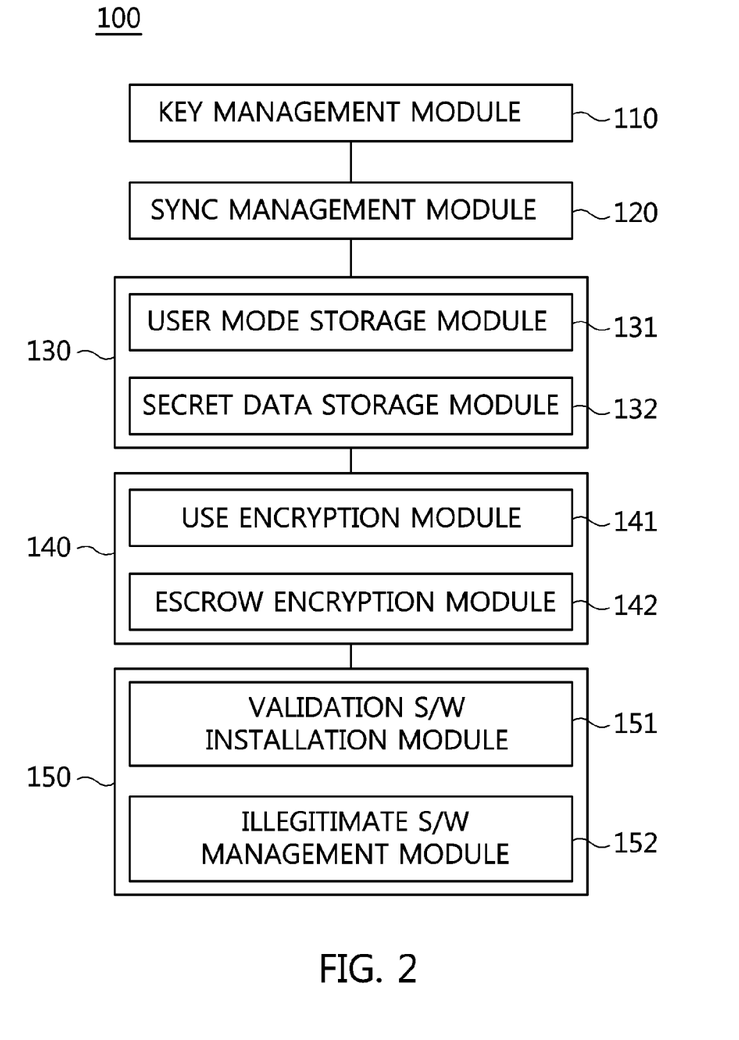
FIG. 2 is a diagram illustrating the configuration of the mobile terminal according to an embodiment of the present invention.

FIG. 2 is a diagram illustrating the configuration of the mobile terminal 100 according to an embodiment of the present invention.

Referring to FIG. 2, the mobile terminal 100 includes a key management module 110, a sync management module 120, a storage management module 130, a data encryption/decryption module 140, and a software (S/W) verification request module 150.

The key management module 110 manages a user key MEK generated by the mobile terminal 100 and a user key EUK received from the escrow server 200.

If the mobile terminal 100 and the user PC 300 desire to share sensitive data, the sync management module 120 requests synchronization with the user PC 300 from the escrow server 200, and establishes a synchronization policy corresponding to a request.

The storage management module 130 determines whether sensitive data will be stored in the escrow server 200 or the storage device of the mobile terminal 100, and determines whether or not to encrypt the sensitive data and establishes a storage policy based on the results of the determination. For this purpose, the storage management module 130 includes a user mode storage module 131 and a secret data storage module 132.

The data encryption/decryption module 140 encrypts the sensitive data based on the results of the determination of the storage management module 130. For this purpose, the data encryption/decryption module 140 includes a use encryption module 141 configured to encrypt the sensitive data when the sensitive data is stored in the storage device of the mobile terminal 100, and an escrow encryption module 142 configured to encrypt the sensitive data when the sensitive data is stored in the escrow server 200.

The use encryption module 141 encrypts the sensitive data using the user key MEK generated by the mobile terminal 100.

The escrow encryption module 142 encrypts the sensitive data using the user key EUK received from the escrow server 200.

When the storage management module 130 determines to store the sensitive data in the escrow server 200, the storage management module 130 sends the sensitive data encrypted by the escrow encryption module 142 to the escrow server 200.

In contrast, when the storage management module 130 determines to store the sensitive data in the storage device of the mobile terminal 100, the user mode storage module 131 and the secret data storage module 132 operate in order to store the sensitive data in the storage device of the mobile terminal 100.

The user mode storage module 131 is a module configured to store common user data in a conventional storage device in a protected or non-protected state.

The secret data storage module 132 is a module configured to store sensitive data having high security strength in a secure depository that is logically or physically separated.

As described above, it is assumed that in the method of storing the sensitive data of a mobile terminal according to an embodiment of the present invention, a logically or physically secure depository has been provided in order to store sensitive data in a mobile terminal.

The S/W verification request module 150 generates a hash value corresponding to information about S/W before the S/W is installed, encrypts the hash value using a user key EUK received from the escrow server 200, sends the encrypted hash value to the escrow server 200, and receives a result corresponding to the encrypted hash value.

If the received result corresponds to valid S/W, the S/W verification request module 150 installs the S/W using a validation S/W installation module 151.

In contrast, if the received result corresponds to invalid S/W, the S/W verification request module 150 stores information about the S/W and the hash value using the illegitimate S/W management module 152, and uses the information about the S/W and the hash value as S/W validation information within the mobile terminal itself.

The configuration of the escrow server 200 is described in detail below with reference to FIG. 3.

Figure 3:
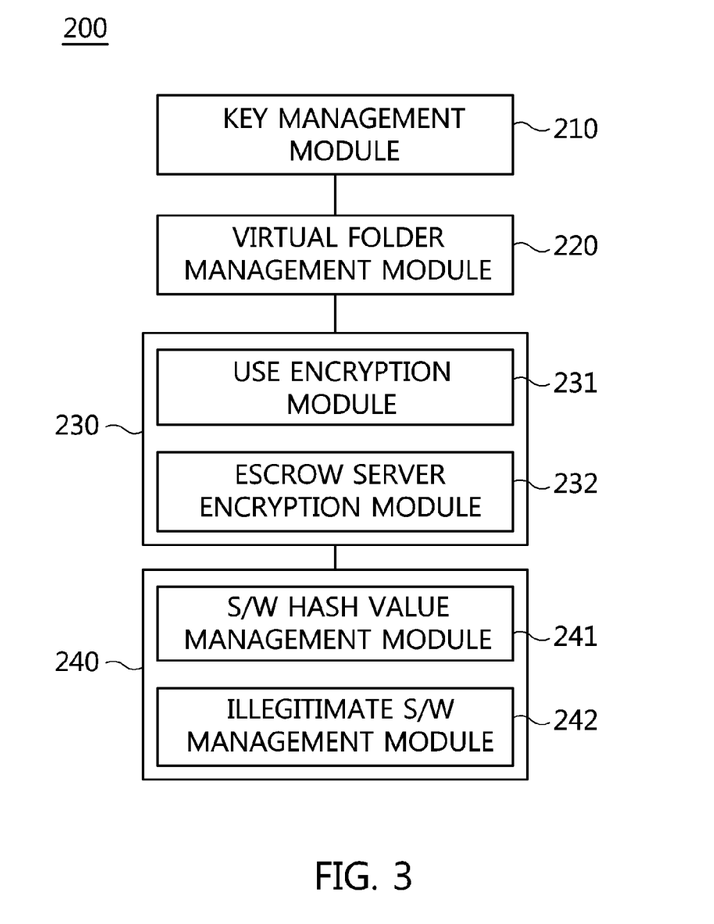
FIG. 3 is a diagram illustrating the configuration of the escrow server according to an embodiment of the present invention.

FIG. 3 is a diagram illustrating the configuration of the escrow server 200 according to an embodiment of the present invention.

Referring to FIG. 3, the escrow server 200 includes a key management module 210, a virtual folder management module 220, a user data encryption/decryption module 230 and an S/W validation module 240.

The key management module 210 generates and manages the user key EUK of the registered mobile terminal 100.

The virtual folder management module 220 generates the user virtual folder of a registered device, that is, the mobile terminal 100, stores the sensitive data of the mobile terminal 100 in the generated user virtual folder, and manages the user virtual in which the sensitive data is stored.

The user data encryption/decryption module 230 re-encrypts encrypted sensitive data, received from the mobile terminal 100, according to a policy.

For this purpose, the user data encryption/decryption module 230 includes a user encryption module 231 configured to perform encryption using the user key MEK generated by the mobile terminal 100, and an escrow server encryption module 232 configured to perform encryption using the user key EUK generated by the escrow server 200.

The S/W validation module 240 compares an S/W hash value received from the mobile terminal 100 with the original hash value of an app managed by the S/W hash value management module 241, and transfers the results of the comparison to the mobile terminal 100.

If, as the results of the comparison, the S/W hash value received from the mobile terminal 100 is found to be different from the original hash value, the S/W validation module 240 determines the corresponding S/W to be illegitimate and stores and manages the hash value and information about the S/W through the illegitimate S/W management module 242.

The S/W hash value management module 241 may refer to the original hash values of new apps registered with the escrow server 200 for validation whenever the new apps of the mobile terminal 100 are generated via a separate system, or may internally store and update information about the new apps.

The configuration of the user PC 300 is described in detail below with reference to FIG. 4.

Figure 4:
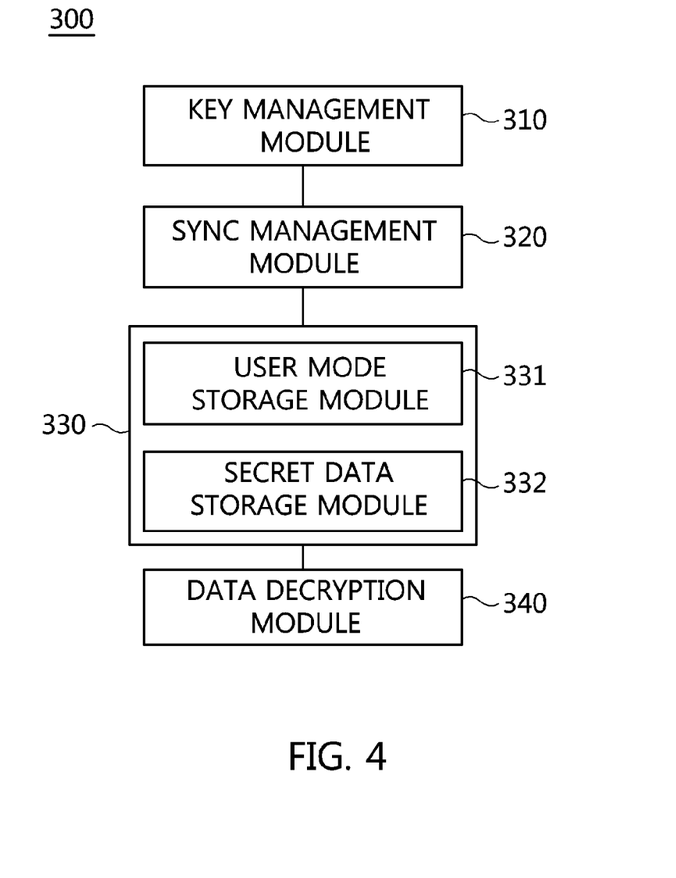
FIG. 4 is a diagram illustrating the configuration of a user PC according to an embodiment of the present invention.

FIG. 4 is a diagram illustrating the configuration of the user PC 300 according to an embodiment of the present invention.

Referring to FIG. 4, the user PC 300 includes a key management module 310, a sync management module 320, a storage management module 330, and a data decryption module 340.

When a device is registered, the key management module 310 manages a user key that is received from the escrow server 200 and a key (e.g., a certificate) that may be received from the mobile terminal 100.

The sync management module 320 is set such that the sensitive data of the mobile terminal 100 is synchronized in the user PC 300, and complies with the synchronization policy of the mobile terminal 100.

The storage management module 330 obtains sensitive data from the escrow server 200 in accordance with a user policy, and stores and manages the obtained sensitive data. In this case, the user PC 300 may logically or physically separate its storage device like the mobile terminal 100.

For this purpose, the storage management module 330 includes a user mode storage module 331 configured to store common data, and a secret data storage module 332 configured to store sensitive data.

The data decryption module 340 decrypts sensitive data stored in the storage management module 330.

The data encryption/decryption module 140 of the mobile terminal 100, the user data encryption/decryption module 230 of the escrow server 200, and the data decryption module 340 of the user PC 300 according to an embodiment of the present invention are described in detail according to three types of cases below.

In the first case, the mobile terminal 100 does not encrypt its sensitive data, but sends the sensitive data to the escrow server 200 through a secure transport channel, and the escrow server 200 encrypts the sensitive data using a user key generated by the escrow server 200.

Sensitive data within the user PC 300 that has been synchronized may be decrypted and transmitted by the escrow server 200, or encrypted sensitive data may be transmitted so that it may be decrypted using a user key received from the escrow server 200 when the device is registered. This method is advantageous in that data is securely stored in the escrow server 200, but is disadvantageous in that the data may be exposed on a transport channel and the escrow server 200 may be aware of the original data.

In the second case, the mobile terminal 100 encrypts its sensitive data using a user key EUK obtained from the escrow server 200 when the device is registered.

The sensitive data of the mobile terminal 100 is secure because it is encrypted and transmitted. If the escrow server 200 stores the encrypted data received from the mobile terminal 100 without change, a performance load may be reduced because an encryption process is avoided. Furthermore, if the encrypted data received from the mobile terminal 100 is further encrypted using the internal key of the escrow server 200 and stored, high security may be guaranteed. The user PC 300 that has been synchronized may easily decrypt data using a user key obtained from the escrow server 200, but there is a disadvantage in that the escrow server 200 may be aware of the original data.

In the third case, the mobile terminal 100 encrypts its sensitive data using a user key MEK generated by the mobile terminal 100. If the mobile terminal 100 encrypts the sensitive data using its user key MEK and sends the encrypted sensitive data, a danger that the original data will be exposed may be avoided because the escrow server 200 does not have the user key MEK. Furthermore, if the encrypted sensitive data is further encrypted using the internal key of the escrow server 200, security may be increased. However, it is cumbersome for the synchronized user PC 300 to receive a key from the mobile terminal 100. This problem may be easily solved using the domain key of a user domain concept as described above.

It is to be noted that an encryption/decryption method used in the method of managing the sensitive data of the mobile terminal according to an embodiment of the present invention is not limited to the three cases and a user authentication method for device registration and a data integrity validation scheme for the transmission and use of data may be various.

A method of protecting the sensitive data of the mobile terminal 100 using the escrow server 200 is described below with reference to FIGS. 5 and 6.

In the method of managing the sensitive data of the mobile terminal according to an embodiment of the present invention, the sensitive data of the mobile terminal 100 may be protected using two methods below.

The first method is to register the mobile terminal 100 with the escrow server 200 and store and manage the sensitive data of the mobile terminal 100 in a user virtual folder within the escrow server 200 using a user key assigned by the escrow server 200.

The second method is to prevent the illegitimate leakage of sensitive data that is attempted via a malicious app by performing the validity verification of the S/W installed on the mobile terminal 100 via the escrow server 200.

The first method is described in detail below with reference to FIG. 5.

Figure 5:
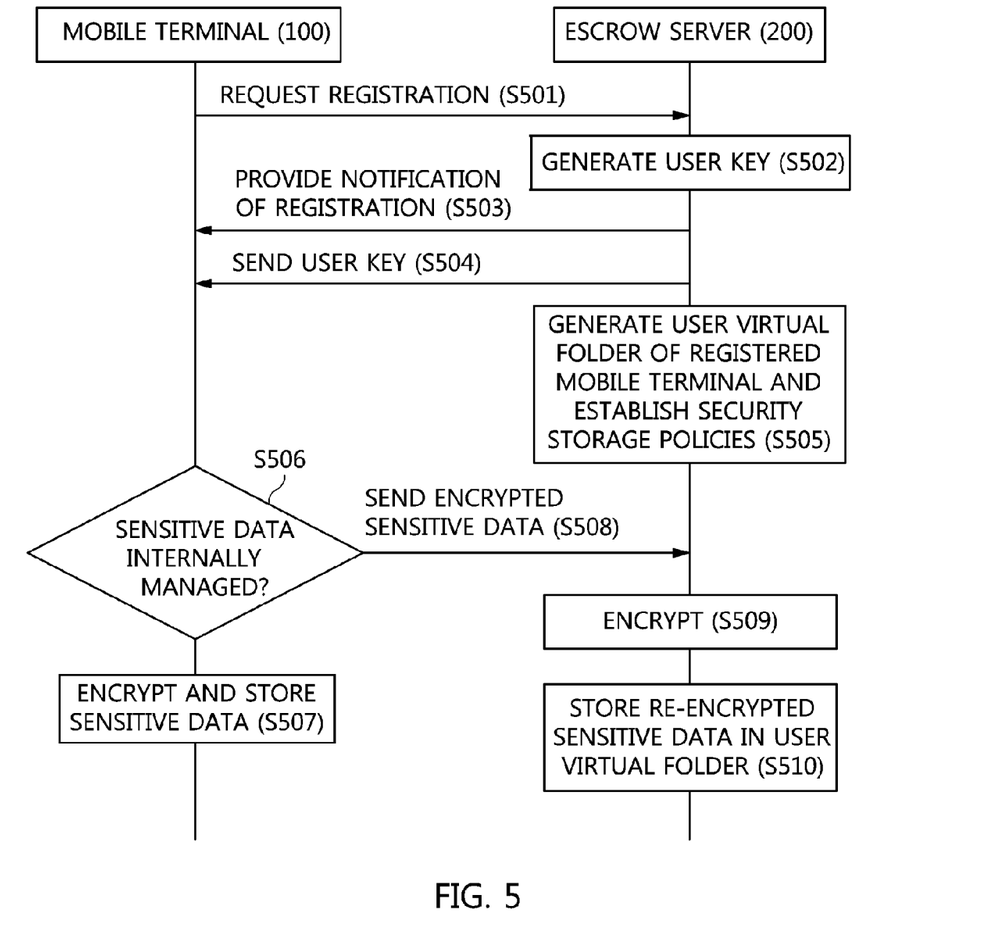
FIG. 5 is a flowchart illustrating a method of managing the sensitive data of a mobile terminal according to an embodiment of the present invention.

FIG. 5 is a flowchart illustrating a method of managing the sensitive data of the mobile terminal according to an embodiment of the present invention.

Referring to FIG. 5, the mobile terminal 100 sends a device registration request to the escrow server 200 at step S501.

At step S502, the escrow server 200 generates a user key based on registration information corresponding to the request received at step S501.

The escrow server 200 sends a registration notification message indicative that the registration of the mobile terminal 100 has been completed to the mobile terminal 100 at step S503. Furthermore, the escrow server 200 sends the user key generated at step S502 to the mobile terminal 100 along with the registration notification message at step S504.

The mobile terminal 100 receives the registration notification message, checks the received registration notification message, and manages the user key through the key management module 110.

Thereafter, the escrow server 200 generates the user virtual folder of the registered mobile terminal 100 and establishes security storage policies, such as an encryption algorithm, mode or unit for encrypting the files of the generated user virtual folder, at step S505.

When the mobile terminal 100 is registered with the escrow server 200 through steps S501 to S505, the mobile terminal 100 determines whether or not the sensitive data will be managed via the escrow server 299 according to the storage policies stored in the storage management module 130, or whether or not the sensitive data will be stored in the storage device of the mobile terminal 100 at step S506.

The mobile terminal 100 may encrypt the sensitive data based on the results of the determination at step S506, and stores the encrypted sensitive data in the storage device at step S507.

The mobile terminal 100 may encrypt the sensitive data based on the results of the determination at step S506, and may send the encrypted sensitive data to the escrow server 200 at step S508.

If the sensitive data of the mobile terminal 100 is managed in the escrow server 200, as at step S508, the escrow server 200 re-encrypts the encrypted sensitive data, received from the mobile terminal 100, using the user key of the escrow server 200 at step S509, and stores the re-encrypted sensitive data in a user virtual folder of the escrow server 200 at step S510. In this case, the sensitive data received from the mobile terminal 100 has been encrypted using the user key of the mobile terminal 100, and the encrypted sensitive data stored in the escrow server 200 is re-encrypted using the user key of the escrow server 200. Accordingly, the security of the sensitive data may be guaranteed when the sensitive data is transmitted or when the sensitive data is exposed to the escrow server 200.

Furthermore, if the user wants to share the sensitive data of the mobile terminal 100 with the user PC 300, that is, another device possessed by the user, the user registers the user PC 300 with the escrow server 200 through user authentication, and requests data synchronization with the user PC 300 from the escrow server 200 via the mobile terminal 100.

More specifically, the mobile terminal 100 may request data synchronization with the user PC 300 from the escrow server 200 via the sync management module 120. The user PC 300 shares the sensitive data via the storage management module 330 based on the settings of the sync management module 320.

The key management module 310 of the user PC 300 manages a user key received from the escrow server 200 when the device is registered and a certificate is received from the mobile terminal 100. The key management module 310 helps the data decryption module 340 to decrypt the sensitive data, encrypted and stored in the storage management module 330, using a corresponding key.

The second method of preventing the illegitimate leakage of sensitive data attempted via a malicious app by performing validity verification on the S/W installed on the mobile terminal 100 through the escrow server 200 is described in detail below with reference to FIG. 6.

Figure 6:
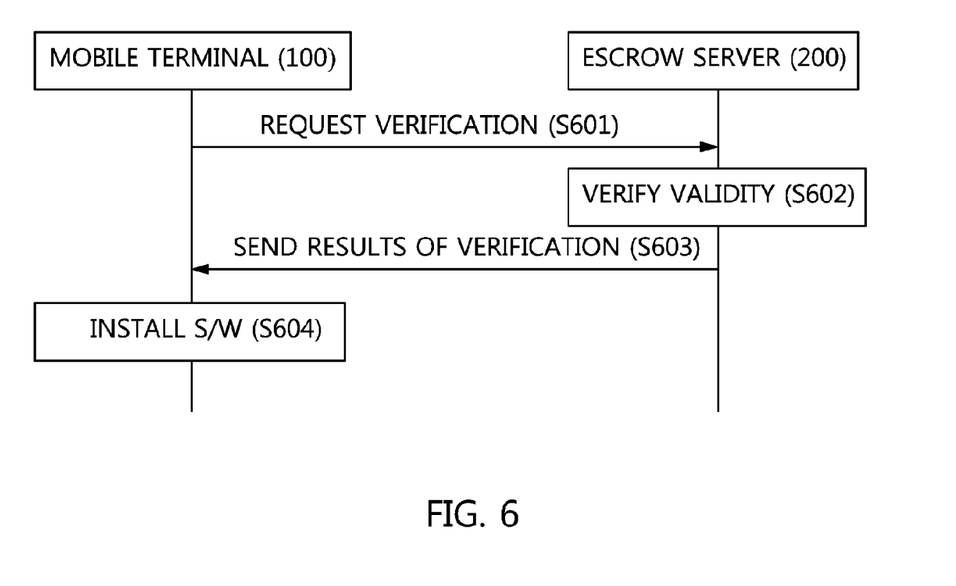
FIG. 6 is a flowchart illustrating a method of verifying validity according to an embodiment of the present invention.

FIG. 6 is a flowchart illustrating a method of verifying validity according to an embodiment of the present invention.

In the method of verifying the validity of S/W through the escrow server 200, first, a user performs an S/W verification procedure through the escrow server 200 before installing the S/W.

Referring to FIG. 6, the mobile terminal 100 requests the escrow server 200 to verify whether or not an app to be installed is S/W corresponding to a valid app at step S601.

The escrow server 200 verifies the validity of the S/W based on information about the S/W that has been received along with the verification request at step S602. More specifically, the escrow server 200 compares the hash value of the S/W with a reference hash value stored in the escrow server 200.

If, as a result of the comparison, the hash value of the S/W is found to be identical with the reference hash value, the escrow server 200 determines the S/W to be legitimate. If, as a result of the comparison, the hash value of the S/W is found to be different from the reference hash value, the escrow server 200 determines the S/W to be an illegitimate or modified file and transfers the results of the verification to the mobile terminal 100 at step S603.

The mobile terminal 100 receives the results of the verification and installs the S/W only when the results of the verification indicate that the S/W is legitimate at step S604. In this case, the installation of illegitimate app S/W that is received through SMS, MMS or various messengers can be prevented.

As described above, the method of managing the sensitive data of the mobile terminal according to an embodiment of the present invention is advantageous in that it can protect the sensitive data of a user within the mobile terminal, can prevent damage resulting from the exposure of data attributable to the loss of the mobile terminal and can prevent the malicious exposure of data by blocking the installation of illegitimate S/W because the sensitive data of the user within the mobile terminal and the verification of S/W to be installed are managed via the escrow server.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of managing sensitive data of a mobile terminal, comprising:
   receiving, by an escrow server comprising a hardware processor, a request for registration from the mobile terminal;
   generating a user key in response to the request for registration;
   generating a user virtual folder adapted to store the sensitive data of the mobile terminal;
   receiving encrypted sensitive data from the mobile terminal when the mobile terminal determines to store the sensitive data in the escrow server; and
   re-encrypting the encrypted sensitive data and storing the re-encrypted sensitive data in the user virtual folder,
   wherein storing the re-encrypted sensitive data in the user virtual folder comprises performing, by the escrow server, verification of validity of software installed on the mobile terminal, and wherein performing the verification of the validity comprises:
      comparing, via the hardware processor, a hash value of the software to a reference hash value stored in the escrow server;
      determining the software to be legitimate when, as a result of the comparison, the hash value of the software is found to be identical to the reference hash value, and determining the software to be illegitimate when, as a result of the comparison, the hash value of the software is found to be different from the reference hash value; and
      sending a result of the determination to the mobile terminal.

2. The method of claim 1, further comprising encrypting, by the mobile terminal, the sensitive data using a second user key of the mobile terminal if the mobile terminal determines to store the sensitive data in a storage device of the mobile terminal.

3. The method of claim 1, wherein receiving the encrypted sensitive data from the mobile terminal comprises receiving the sensitive data encrypted by the mobile terminal using the user key.

4. An escrow server, comprising a hardware processor configured to implement:
   a key manager manager to generate and manage a user key of a registered mobile terminal;
   a virtual folder manager to generate and manage a user virtual folder for storing sensitive data of the registered mobile terminal;
   a data encryptor/decryptor to re-encrypt encrypted sensitive data, received from the registered mobile terminal, according to policies and to store the re-encrypted sensitive data in the user virtual folder; and
   a software verifier to perform verification of validity of software installed on the registered mobile terminal, wherein the software verifier compares a hash value of the software received from the registered mobile terminal to an original hash value of the software, determines the software to be legitimate when, as a result of the comparison, the hash value of the software is found to be identical with the original hash value, and determines the software to be illegitimate when, as the result of the comparison, the hash value of the software is found to be different from the original hash value.

5. The escrow server of claim 4, wherein the data encryptor/decryptor comprises:
   a user encryptor to perform encryption using a second user key generated by the registered mobile terminal; and
   an escrow server encryptor to perform encryption using the user key generated by the escrow server.

6. The escrow server of claim 4, wherein the software verifier comprises:

a software hash value manager to refer to original hash values of new apps registered with the escrow server for verification whenever the new apps of the registered mobile terminal are generated via a separate system or to internally store and update the original hash values; and an illegitimate software manager to manage information about the software when the hash value of the software is found to be different from the original hash value of the software and thus the software is determined to be illegitimate.

* * * * *